Patented June 26, 1928.

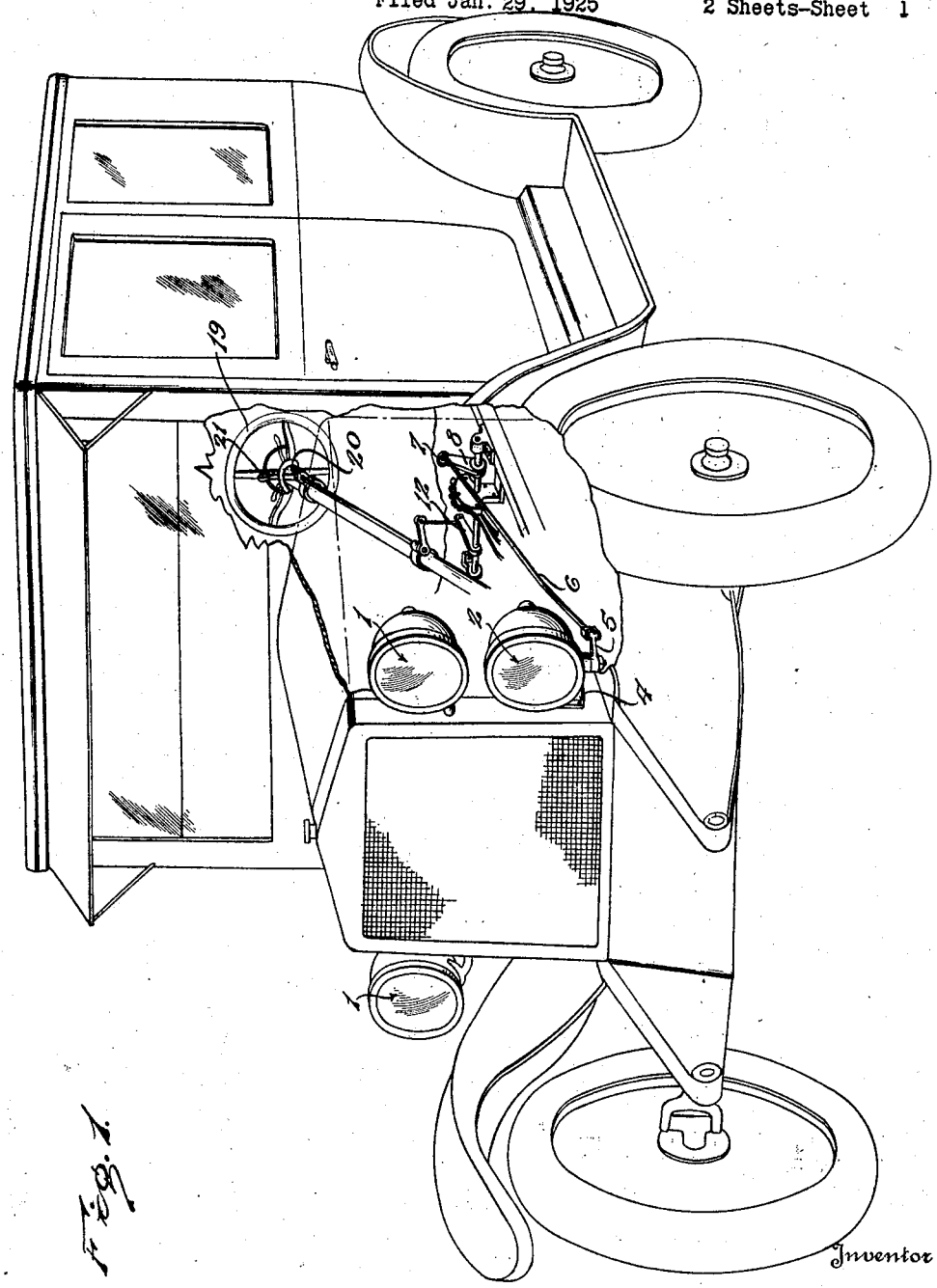

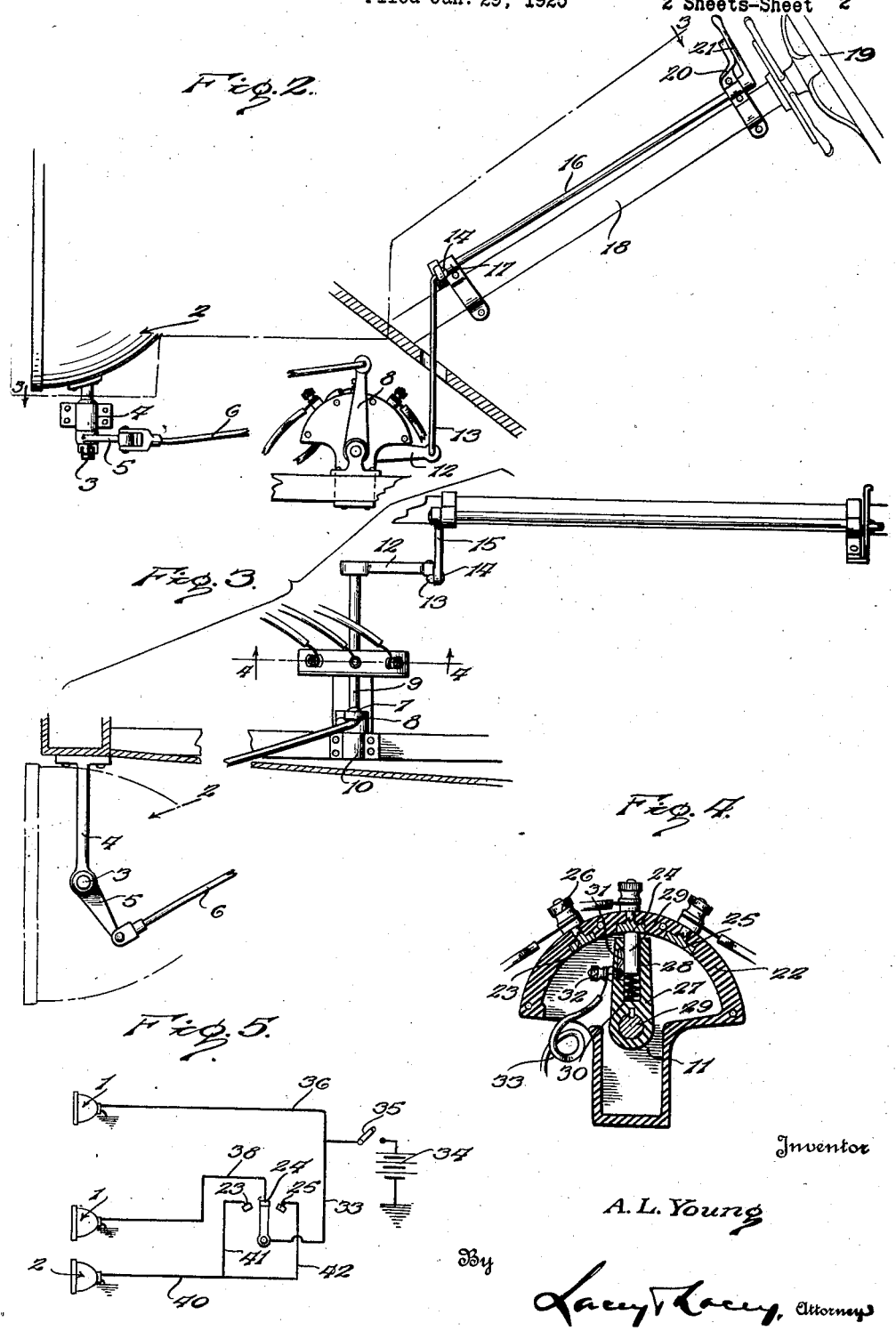

1,675,239

UNITED STATES PATENT OFFICE.

ARTHUR L. YOUNG, OF BROKAW, WISCONSIN.

LIGHTING SYSTEM FOR AUTOMOBILES.

Application filed January 29, 1925. Serial No. 5,547.

This invention relates to an improved arrangement of headlights for automobiles and has as its general object to provide an arrangement of headlights which will be of great assistance to the driver of the automobile when traveling upon country roads at night and which will generally promote safety in night driving.

It is well known that on approaching a car having glaring headlights, a driver cannot determine with any degree of certainty the condition of the road at his right, with the result that many accidents are caused by drivers, blinded by the headlights of an oncoming automobile, driving their machines into ruts or obstructions at the right hand side of the road. Likewise, drivers experience difficulty in turning into side roads and in rounding curves, where their cars are equipped with the ordinary headlights, because of their inability to clearly observe the condition of the road to their right or left.

In consideration of the foregoing, the present invention has, as one of its objects, to provide an auxiliary headlight mounted in juxtaposition to the left hand headlight of an automobile, together with means whereby the auxiliary headlight may be readily adjusted to direct its rays either to the right or to the left as occasion may require, so that the driver of the automobile may observe the condition of the road at the right or left before making a turn and may illuminate the right hand side of the roadway in passing a machine having glaring headlights.

Another object of the invention is to provide, in connection with an auxiliary headlight and its operating means as briefly described above, means whereby the said auxiliary headlight will be automatically supplied with current when it is turned either to the right or to the left and whereby the headlight with which it is associated will, at such time, be cut out of circuit, thereby presenting to view no more than two headlights at any one time and thus avoiding any confusion which might be caused if all three lights were simultaneously lighted, the arrangement, furthermore, being such that when the auxiliary headlight is adjusted to position facing directly forwardly, the associated main headlight will be in circuit with the source of current supply and the auxiliary headlight will be out of circuit and, therefore, extinguished.

In the accompanying drawings:

Figure 1 is a perspective view of the invention applied to an automobile.

Figure 2 is a side elevation of the invention installed, such parts of the automobile as are necessary to an understanding of the invention, being shown partly in elevation and partly in section.

Figure 3 is a plan view of the device embodying the invention installed.

Figure 4 is a detail vertical sectional view on the line 4—4 of Figure 3, looking in the direction indicated by the arrows.

Figure 5 is a diagrammatic view illustrating the wiring system.

In the drawings, and particularly in Figure 1 thereof, the device embodying the invention is illustrated as installed upon an automobile and in the said figure the headlights with which the automobile is ordinarily equipped are indicated in general by the numeral 1, these headlights being hereinafter referred to as the main headlights. As previously stated, the invention contemplates the provision of an auxiliary headlight for illuminating either side of the roadway at the will of the driver of the automobile, and this auxiliary headlight is indicated in general by the reference numeral 2, the same being provided with a short standard 3 which is rotatably mounted in a bearing bracket 4, in turn fixedly mounted upon some convenient part of the automobile such, for example, as the side of the radiator, and in position beneath the main headlight 1 at the left of the machine. The standard 3 projects a short distance below the bearing bracket 4 and has fixed upon it the inner end of an arm 5 which extends laterally outwardly and to which is connected the forward end of a rod 6 which, at its rear end is pivotally connected as at 7, to the upper end of a lever arm indicated by the numeral 8. The arm 8 is fixed upon one end of a shaft which is indicated by the numeral 9, and which is journaled in a suitable bearing 10 upon the chassis frame of the automobile and likewise journaled in the casing 11 of a switch which will be presently more specifically described. Upon the other end of the shaft 9 is fixed a lever arm 12 to which is connected the lower end of a link 13, the upper end of the link being connected as at 14, to the outer end of an arm 15 which is fixed upon the lower forward end of a rod or rock shaft 16 which is mounted in suitable bearings 17 upon the steering column 18 of the automobile, the said rod or shaft extending approximately parallel to the said column and terminating at its upper end immediately in advance of the steering wheel 19. A rack 20 is fixed upon the steering column near the wheel 19 and an operating hand lever 21 is fixed upon the upper rear end of the shaft 16 and constitutes means whereby the shaft may be rocked, the said lever coacting with the rack 20 and being thus held in different positions of adjustment. At this point it will be evident that by adjusting the hand lever 21, the auxiliary headlight 2 may be adjusted to direct its rays either to the right or to the left of the automobile and likewise may be adjusted to be presented forwardly, motion being transmitted to the headlight standard from the lever 21 through the medium of the rock shaft 16, the lever arm 15, link 13, lever arm 12, shaft 9, connecting rod 6, and lever arm 5.

In order that the supply of current to the main and auxiliary headlights may be controlled automatically, in the adjustment of the auxiliary headlight, so as to effect illumination of the auxiliary headlight when swung either toward the right or toward the left, and at the same time, cut off the supply of current to the left hand headlight with which it is associated, and, on the other hand, to effect a supply of current to the said left hand main headlight when the auxiliary headlight is adjusted to its intermediate position, and at such time cut off the supply of current to said auxiliary headlight, so that there will be at no time more than two headlights burning at the front of the machine, a switch is provided which will now be described. The switch is best illustrated in Figure 4 of the drawings, and comprises the casing 11, heretofore referred to, which casing is mounted upon any suitable support, in turn mounted upon the chassis frame of the automobile, and the casing embodies an arcuate body 22 of insulating material in which are embedded a number of contacts indicated one by the numeral 23, another by the numeral 24, and a third by the numeral 25, each contact, being equipped with a binding post 26. The contacting faces of the contacts 23, 24 and 25 are flush with the concave face of the insulating body 22, as clearly shown in Figure 4, so that the movable contact of the switch may ride smoothly over the said face of the body 22 and the said contact faces of the contacts 23, 24 and 25. The movable contact comprises an arm 27 of insulating material which is fixed upon the shaft 9 within the casing 11 and is provided with a bore 28 in which is slidably mounted a contact point 29, the outer end of which is held constantly in engagement with the inner face of the body 22 or the faces of the contacts, through the medium of a spring 30 arranged within the bore and bearing at one end against the inner end of the bore and at its other end against the inner end of the said contact point 29. A contact spring 31 is arranged in a recess in the wall of the bore 28 and bears at all times against one side of the contact point 29 and this spring is electrically connected with and secured by a binding post 32. A conductor wire 33 is led from the battery 34 of the lighting system of the automobile to the binding post 32, through the lower side of the casing 11, and a switch 35 is interposed in this wire, this switch being the one ordinarily located upon the instrument board of the automobile. A conductor wire 36 leads from the wire 33 to the right hand main headlight of the automobile. A conductor wire 38 is connected to the binding post of the contact 24 and leads to the left hand main headlight 1, and a conductor wire 40 is electrically connected with the auxiliary headlight 2 and branches 41 and 42 from this wire lead to and are connected with the binding posts of the contacts 23 and 25 respectively.

It will now be understood that under ordinary running conditions and with the main headlights burning, the switch 35 will be closed and the contact point 29 will be in electrical contact with the contact 24 so that current will be supplied to both of the main headlights 1. At such time, however, the auxiliary headlight 2 will be out of circuit. However, should the driver of the automobile wish to direct light rays from the headlight 2 toward either side of the road, he will adjust the hand lever 21 to effect rotation or turning of the auxiliary headlight in the proper direction and at such time, the arm 27 will be so angularly adjusted as to bring the contact point 29 into engagement with one or the other of the contacts 23 or 25. This will result in closing of the circuit through the auxiliary headlight 2 and in breaking of the circuit through the headlight 1 at the left hand side of the automobile.

Having thus described the invention, what I claim is:

1. In a lighting system for vehicles, a fixed lamp, an angularly adjustable lamp, actuating means for the adjustable lamp including a rotary member connected with the adjustable lamp, operating means for the rotary member, an electric circuit including both the fixed and the adjustable lamps, and a switch in the said circuit including a middle and side contacts and a movable member connected with and operable by means of the said rotary member and normally closing the circuit of the fixed lamp through the middle contact and adapted to close the circuit of the adjustable lamp through either of the said side contacts and simultaneously break the circuit of the fixed lamp and illuminate the adjustable lamp when the adjustable lamp is turned out of its normal position.

2. In a lighting system for vehicles, a fixed lamp, an angularly adjustable lamp, actuating means for the adjustable lamp including a rotary shaft, actuating means to rotate said shaft, means to transmit motion from the shaft to the adjustable lamp to adjust the position thereof when the lamp is rotated, a casing rigidly supported and disposed about said shaft and constituting a bearing for the shaft, an arcuate strip of insulating material carried by said casing and disposed transversely across said shaft, a contact carried by and extending radially from said shaft within the casing and bearing against the inner face of said strip, a center contact and auxiliary contacts carried by said strip in spaced relation to each other and engageable by the first contact, the first contact normally bearing against the center contact, and a lighting circuit for said lamps including a conductor secured to the first contact, a conductor connecting the fixed lamp with the center contact, and a conductor leading from the adjustable lamp and having branches secured to the auxiliary contacts whereby the fixed lamp and adjustable lamp may be illuminated and extinguished in timed relation to movement of the adjustable lamp.

In testimony whereof I affix my signature.

ARTHUR L. YOUNG. [L. S.]